Oct. 18, 1960   D. W. BROWNE   2,956,325
BAND CLAMP
Filed Oct. 30, 1957   3 Sheets-Sheet 1
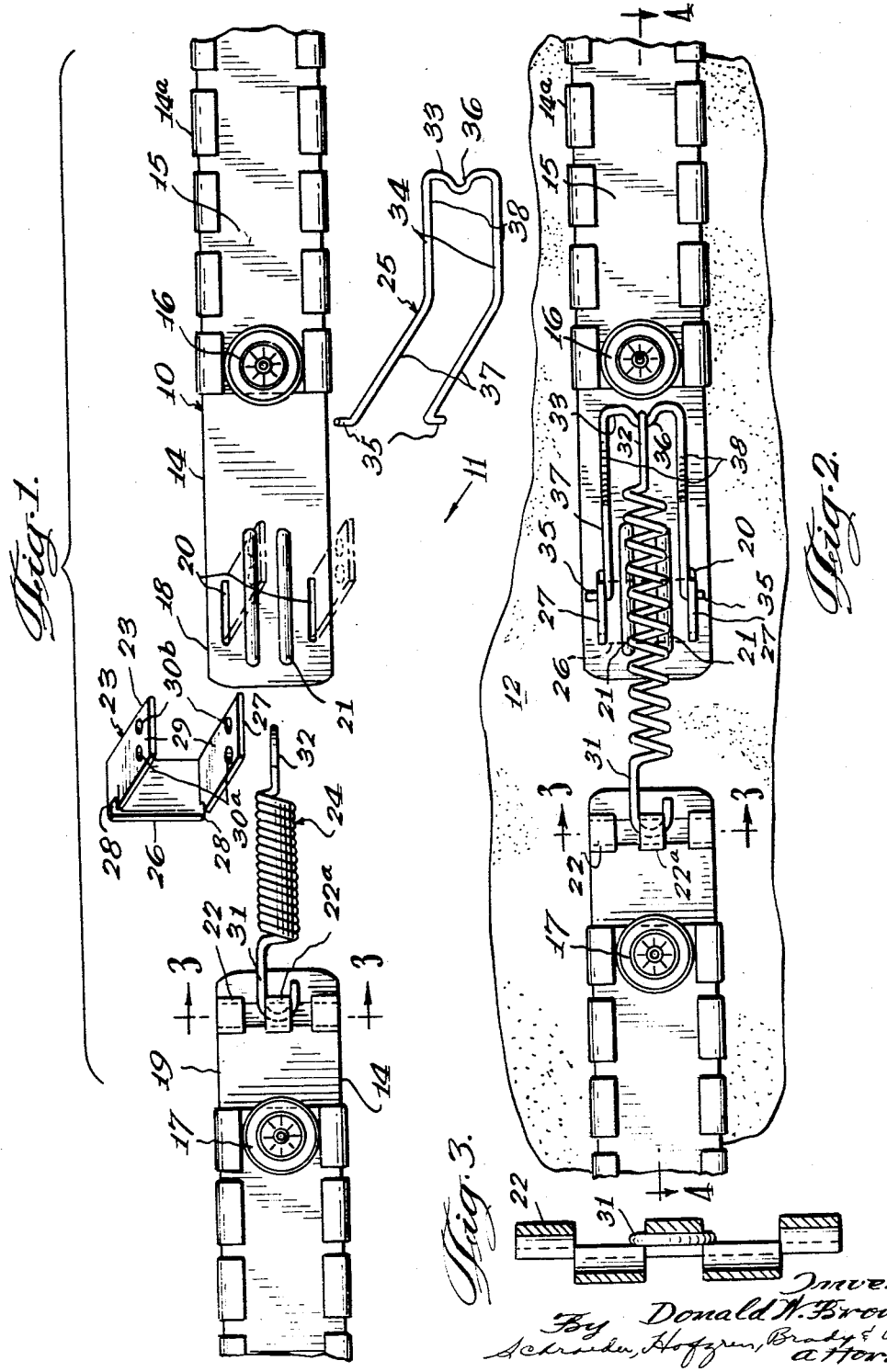

Oct. 18, 1960  D. W. BROWNE  2,956,325
BAND CLAMP
Filed Oct. 30, 1957  3 Sheets-Sheet 2
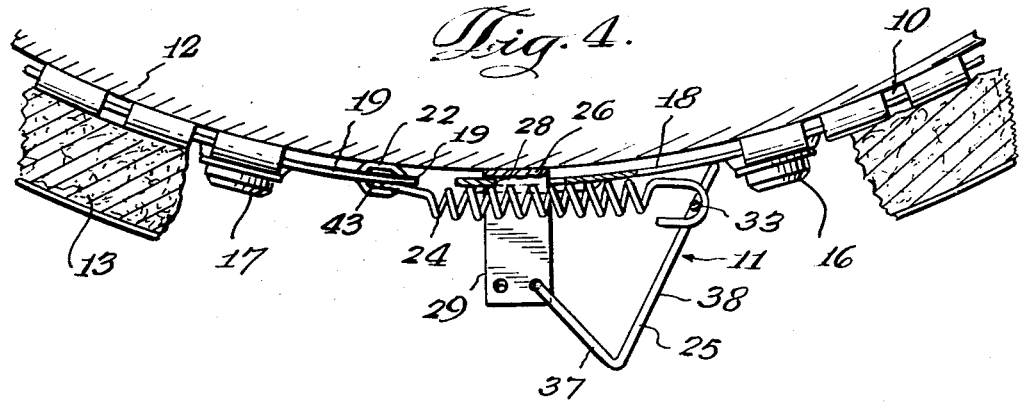
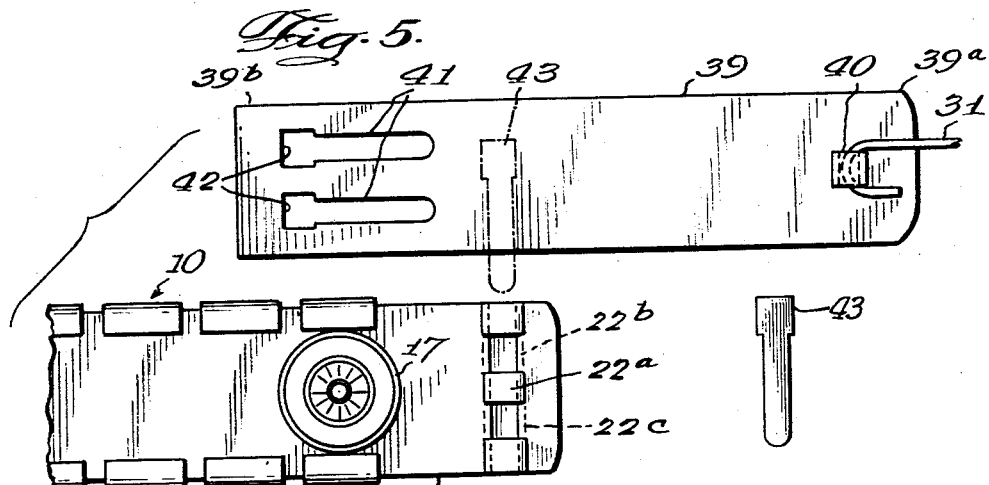
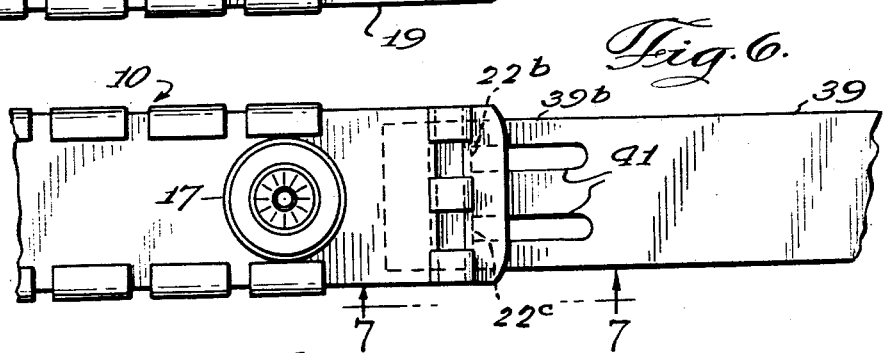
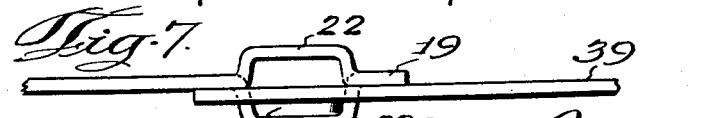
Inventor
Donald W. Browne

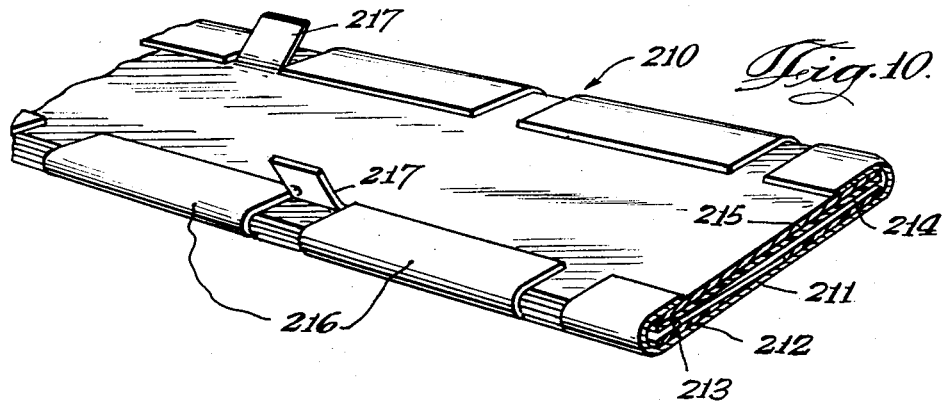
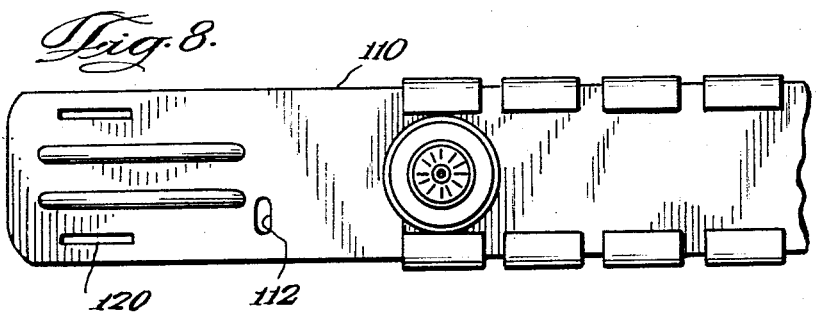
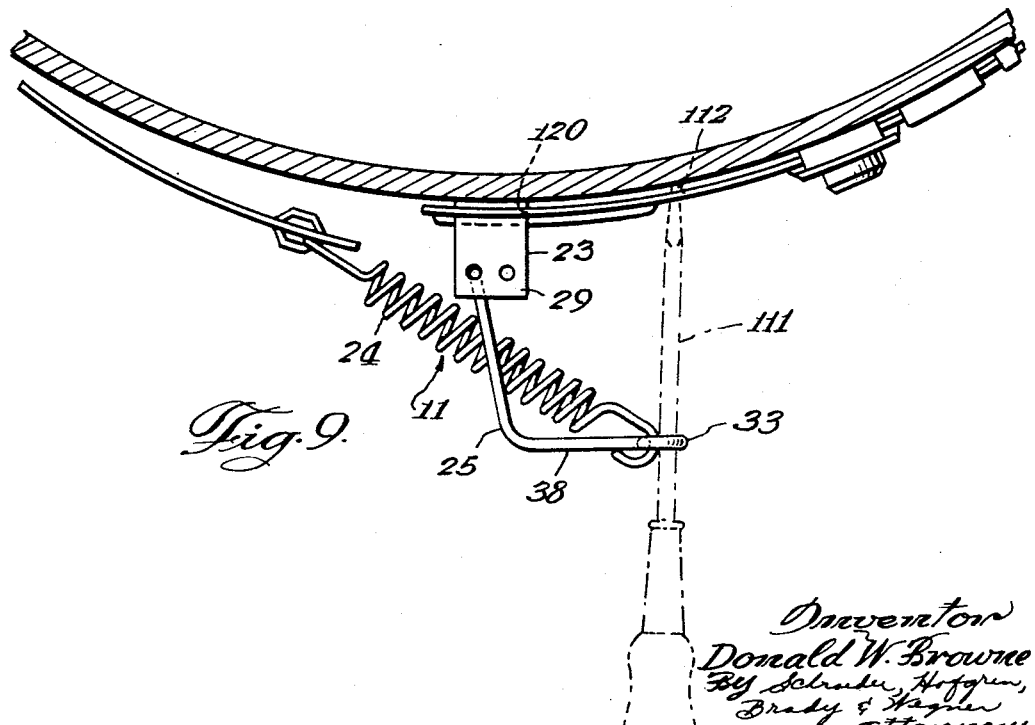

United States Patent Office 2,956,325
Patented Oct. 18, 1960

2,956,325

BAND CLAMP

Donald W. Browne, Des Plaines, Ill., assignor to Acra Electric Corporation, a corporation of Illinois Filed Oct. 30, 1957, Ser. No. 694,477

8 Claims. (Cl. 24—271)

This invention relates to a band clamp and in particular to a connector assembly for resiliently securing a band tightly around an object such as a heating tank.

This application is a continuation-in-part of my copending application Serial No. 682,013 for a band clamp, filed September 4, 1957 and now abandoned.

The principal feature of this invention is to provide a new and improved band connector assembly.

Another feature is to provide such an assembly having an extremely simple and economical structure which may be readily removably associated with the ends of the band.

A further feature is to provide such an assembly wherein the retaining functioning of the connector is resilient and effected by the simple over-center disposition of an operating lever forming a part thereof.

Still another feature is the provision of such a connector assembly wherein new and improved means for association thereof with the band ends are provided, including a bracket adapted to be extended through a suitable opening in one end of the band and provided with notch means for co-operation with the band to lock the bracket thereon.

A still further feature is the provision in such a connector assembly of a lever pivotally secured to an outer end of the bracket and having angularly related portions, one end of one portion being pivotally secured to the bracket whereby the lever is disposed in ready grasping position at all times.

A still further feature of the invention is the provision of such bracket and lever structures, each of which comprises a U-shaped member whereby the pivotal association of the lever with the bracket is such as to permit ready connection of the lever relative to the bracket while precluding movement of the lever in the direction of the axis of pivoting.

A yet further feature is the provision in such a band assembly of an extension strip having new and improved means for association with one end of the band and arranged for ready association with a portion of the biasing means.

Still another feature is that the means for securing the extension strip to the band end comprises a loop formed in the band end and an opening formed in the extension strip, with the piece of material removed from the strip to define the opening serving as a pin for association with the loop to retain the extension strip end in facial engagement with the band end.

A further feature of the invention is the provision of a band connector means having new and improved means for effecting operation thereof.

Another feature is that said means for effecting operation of the connector assembly comprises a means associated with the band for ready engagement by a suitable lever member permitting desired manipulation of the lever member.

Still another feautre of the invention is the provision of means on the band to retain separate elements of the band against relative longitudinal displacement.

A still further feature is that the means on the band comprises a tab on one of the elements disposed between longitudinally spaced clamping members normally provided on another of the elements.

Other features and advantages of this invention will be apparent from the following description taken in connection with the accompanying drawings wherein:

Fig. 1 is an exploded view of a band assembly embodying the invention, with the band shown fragmentarily;

Fig. 2 is a front elevation of the band assembly installed circumjacent a portion of the heating tank, with the connector arranged in the clamped condition;

Fig. 3 is an enlarged transverse section taken approximately along the line 3—3 of Fig. 2;

Fig. 4 is a longitudinal section taken approximately along the line 4—4 of Fig. 2;

Fig. 5 is an exploded view of a portion of such a band assembly including an extension strip;

Fig. 6 is a front elevation thereof;

Fig. 7 is a fragmentary edge view of a portion thereof;

Fig. 8 is a fragmentary plan view of a band construction having tool engaging means for use in operating the connector;

Fig. 9 is a fragmentary longitudinal section of a band assembly including the tool engaging means, with a portion of a suitable operating tool shown in broken lines; and Fig. 10 is an enlarged, fragmentary isometric view of a band construction having means for locking the band elements against relative longitudinal displacement.

In the exemplary embodiment of the invention as disclosed in Figs. 1 through 7 of the drawings, a band assembly is shown to comprise a band generally designated 10 and a connector generally designated 11 for resiliently clamping the two ends of the band together thereby to draw tightly the band around an object such as a hot water tank 12. To permit the band 10 to be installed around the tank within a surrounding body of insulation, such as shown at 13 in Fig. 4, it is desirable to effect association of the connector 11 with the band subsequent to such installation. This permits the band to be inserted longitudinally through a space between insulation 13 and tank 12 without requiring the provision of an undesirably large tunnel. Connector 11 and band 10 are arranged so that operative association therebetween is readily effected when the band is so installed. Further, the connector is arranged to occupy a minimal space so that a minimized entrance opening through the insulation will accommodate the connector. Additionally, the connector structure is of a new and improved design of extreme simplicity and economy, yet which is arranged to secure the band properly in tight engagement with the tank.

More specifically, band 10 comprises a heater band having an elongated base 14 on which is carried a suitable heating means 15 arranged to be energized electrically by the connection to heating means terminals 16 and 17 of suitable electrical power supply means (not shown). Heating means 15 may be secured to base 14 in a conventional manner by means of a plurality of inturned flanges 14a on base 14.

Base 14 is preferably formed of a material having substantial tensile strength and heat conductivity, such as a metal. Ends 18 and 19 of the base are arranged for ready co-operation with connector 11 which draws them resiliently together to retain the band 10 about tank 12. Thus, end 18 is provided with a pair of transversely (relative to the band base 14) spaced and longitudinally elongated slots 20. Intermediate slots 20, the base may be provided with suitable ribs 21 for reinforcing the end 18. End 19 is provided with a plurality of loop elements 22 struck from end 19 to project seriatim alternatively upwardly and downwardly therefrom. The center loop element 22a, intermediate the transverse edges of band end 19, is arranged to project upwardly from end 19 (in a direction away from tank 12) when the band is properly installed thereon.

As best seen in Fig. 1, connector 11 comprises three simple elements, namely a bracket 23, a resilient member 24 and a lever 25. Bracket 23 is arranged to extend through slots 20 and comprises a U-shaped element having an inner base portion 26 and a pair of spaced legs 27 arranged to align with slots 20. Base portion 26 is flat and extends longitudinally substantially the length of slots 20. A notch 28 is provided in each of legs 27 adjacent base portion 26 to open longitudinally outwardly. The outer portions 29 of legs 27 are provided with a plurality of longitudinally spaced, transversely aligned openings as 30a and 30b for association with lever 25, as will be brought out more fully hereinafter.

Resilient member 24, in the illustrated embodiment, comprises a helical spring having one end 31 comprising a hook adapted to engage middle loop 22a on band end 19. The opposite end 32 of spring 24 comprises a hook which is arranged to engage a portion of lever 25 as will be brought out more fully hereinafter. Spring 24 is preferably relatively strong to provide a substantial clamping or holding force to maintain the band 10 in intimate contact with tank 12 and effect efficient heat transfer therebetween.

Lever 25, in the illustrated embodiment, comprises a U-shaped rod member having a transversely extending outer end 33 and a pair of transversely spaced legs 34. The inner ends 35 of the legs are bent outwardly to extend at right angles to the longitudinal extent of the lever. The space between legs 34 is made comparable to the spacing between legs 27 of bracket 23 so that ends 35 of the lever may project into either of aligned holes 30a or aligned holes 30b of the bracket to permit ready pivoting of lever 25 relative to the outer portion 29 of the bracket, while precluding skewing and movement of the lever in the direction of the axis of pivoting.

Lever end 33 is formed inwardly at the transverse mid-portion 36 thereof for retaining association with hooked end 32 of spring member 24. As discussed above, lever 25 is arranged to pivot about the outer portion 29 of bracket 23 and thus spring 24 is extended by a swinging of end 33 of the lever away from band end 19. Referring now to Fig. 4, it may be seen that, when spring end 32 is hooked to lever end 33 and end 33 is swung to a position spaced from bracket 23 opposite band end 19 and between band end 18 and outer portion 29 of bracket 23, the urging action of spring 24 causes the lever to pivot towards band end 18 until end 33 thereof abuts the outer surface of the band end. Thus, an over-center relationship is established between spring 24 and lever 25 which effects an automatic locking of connector 11 in a band clamping position.

To facilitate manual operation of lever 25, each leg 34 thereof comprises two angularly related portions, namely an inner portion 37 and an outer portion 38. As best seen in Fig. 4, the angular relationship may be approximately right-angular, thus the lever may project substantially outwardly from bracket 23 to permit ready grasping of the lever at the junction between the two lever portions.

The installation and operation of the band and connector assembly is extremely simple. As discussed above, band 10 may be installed around tank 12 by insertion longitudinally between tank 12 and insulation 13 until band ends 18 and 19 are properly positioned. Bracket 23 is then installed on end 18 by inserting outer portions 29 through slots 20 to extend outwardly from base 14 (in a direction away from tank 12). The legs 27 of bracket 23 are moved through the slots until inner portion 26 of the bracket is facially juxtaposed to the inner surface of band end 18. Thus arranged, notches 28 are aligned with base 14 and the bracket is then moved longitudinally to the left, as seen in Fig. 1, whereby the notches engage the band end 18 at the outer ends of slots 20. This effectively locks bracket 23 to band end 18. End 31 of spring 24 is hooked to loop 22a of band end 19 and lever 25 is pivotally connected to outer portions 29 of bracket 23 by inserting ends 31 thereof into openings 30b of the bracket. End 32 of spring 24 is connected onto indented mid-portion 36 of the lever.

Lever 25 is then pivoted to move end 33 thereof away from band end 19 (in a counterclockwise direction, as seen in Fig. 4). When end 33 becomes over-centered with relationship to outer ends 31 of the lever, spring 24 urges the lever in this counterclockwise direction until end 33 abuts band end 18. Should it be found that a lesser amount of tensioning is desired, ends 31 of the lever may be inserted into opening 30a of the bracket rather than into openings 30b, thus extending spring 24 to a lesser degree in the clamped position. It should be noted that any tendency of bracket 23 to be pivoted in a clockwise direction (Fig. 4) about its connection to band end 18 by the action of spring 24 is positively resisted by the coaction of the notches 28 and the substantial longitudinal extent of base portion 26 of the bracket. Thus, connector 11 is readily and positively installed to clamp securely band 10 about tank 12.

If it is desired to remove band 10 from tank 12 for any reason, connector 11 may be readily removed from the band by a reverse pivoting of lever 25 to release the clamping force on ends 18 and 19 of the band. The accessibility of lever 25 for this purpose, resulting from the angular relationship of the lever portions 37 and 38, permits improved ease in such manipulation. Once lever 25 has been pivoted sufficiently, spring 34 is unhooked from lever end 33 and loop 22a, and lever 25 is removed from engagement with bracket 23 by squeezing inner portions 37 together slightly to remove ends 35 from the bracket openings. Bracket 23 is then moved longitudinally of band end 18 in slots 20 so as to disengage the notches 28 from the band at the outer end of the slots and allow withdrawal of legs 27 through slots 20. Connector 11 being thus removed from band ends 18 and 19, the band may be longitudinally withdrawn from its circumjacent position relative to tank 12 as desired.

To convert band 10 for use with a tank having a diameter larger than that of tank 12, an extension strip 39 is provided which effectively extends the end 19 of band 10 a distance equal to the increase in the circumference of the enlarged tank over the circumference of tank 12. Extension strip 39 is seen in Figs. 5 through 7 to comprise a flat strip provided at one end 39a with an upstanding loop 40 generally similar to loop 22a of band end 19 and arranged to co-operate with hooked end 31 of spring 24 in a similar manner. At the opposite end 39b, strip 39 is provided with a pair of longitudinally extending, transversely spaced slots 41 each of which is provided with an enlarged end 42 adapted for extension therethrough of loops 22b and 22c adjacent center loop 22a and extending inwardly (in the opposite direction from loop 22a). The body of material which is removed in forming a slot 42 comprises a flat pin 43 which is adapted to be inserted longitudinally through loops 22b and 22c inwardly of strip 39 thereby to lock the strip end 39a to end 19 of band 10. The insertion and removal of pin 43 is readily accomplished so that extension strip 39 may be readily connected or disconnected from band 10 as desired.

The use of the connector 11 when strip 39 is employed is substantially identical to the use thereof when the band is installed without the strip as described above, as loops 22a and 40 function similarly. However, through use of the simple structure of the strip 39a, band 10 of standard length is readily converted for use with an enlarged tank.

Referring now more specifically to Figs. 8 and 9, a modified form of band assembly is shown to comprise a band, generally designated 110, arranged for improved coaction with connector 11. To facilitate the pivoting of lever 25 against the resistive force of spring 24, a suitable lever member, such as screwdriver 111, may be employed. To provide a proper fulcrum for the action of screwdriver 111, means are provided on the band assembly for engagement by the end of the screwdriver. This fulcrum means may comprise any suitable tool engaging means, and as best seen in Fig. 8, may comprise a suitable slot 112 in band 110. Slot 112 preferably extends transversely of band 110 and is spaced longitudinally from the slots 120 for receiving the bracket 23 of the connector 11. As best seen in Fig. 9, slot 112 is spaced longitudinally from the outer portion 29 of the bracket 23 a distance approximately equal to the spacing of outer portion 33 of the lever 25 from the bracket portion 29. Thus, with the screwdriver bearing against the outer end 33 of lever 25, a pivotal movement of screwdriver 111 in a counterclockwise direction about slot 112 (as seen in Fig. 9) effects a corresponding counterclockwise movement of lever 25 relative to bracket 23. The described disposition of slot 112 permits the screwdriver to have improved leverage during such manipulation of lever 25 while assuring that the screwdriver tip will be properly retained in the slot during the manipulation. When end 33 has been swung sufficiently toward band 110 to be in an over-centered relationship with the pivotal connection of lever 25 to bracket 23, the action of spring 24 completes the pivotal movement of the lever 25 to force end 33 against band 110 and effect the desired clamping of the band.

Referring now more specifically to Fig. 10 of the drawing, an improved band construction generally designated 210 is shown. Band 210 is of the type comprising a relatively rigid baseplate 211, a first insulating sheet 212, a suitable electric heating wire element 213, a superposed insulating sheet 214, and a rigid covering sheet 215. At spaced intervals along its longitudinal margins, baseplate 211 is provided with a plurality of upstanding flanges 216. The flanges extend from the baseplate laterally around the intermediate insulating sheets and electrical element to overlie and bear against the coverplate 215 thereby to retain the band elements in assembled relationship. It has been found, however, that notwithstanding the holding action of flanges 216, relative displacement in a longitudinal direction sometimes occurs between coverplate 215 and baseplate 211. To preclude this undesired displacement, coverplate 215 is provided with one or more tabs 217 struck from the longitudinal margins of the coverplate to extend upwardly therefrom (in a direction away from baseplate 211). The tabs 217 preferably extend longitudinally of the coverplate a distance comparable to the spacing between successive flanges 216 of the baseplate and are arranged to be retained therebetween. Thus, any force tending to move coverplate 215 longitudinally relative to baseplate 211 in either longitudinal direction is positively opposed by the coaction of flanges 216 and tabs 217.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A band assembly comprising: a band adapted to be disposed circumjacent an object, and having ends; a bracket having an inner portion removably secured to one end of the band to have an outer portion thereof spaced from the surface of the band; a resilient member having one end adapted to be secured to the other end of the band; a lever having one end pivotally secured to the outer portion of the bracket and a portion to which the other end of the resilient member is secured, said portion being movable to a point spaced from said bracket laterally opposite said one end of the resilient member and inwardly of the outer portion of the bracket; and tool engaging means on said band adjacent said one end arranged to serve as a fulcrum for a lever member to bear against said portion and urge said portion to said point, said tool engaging means comprising a portion of the band defining a slot elongated transversely of the band.

2. A band assembly comprising: a band adapted to be disposed circumjacent an object, and having ends; a bracket having an inner portion removably secured to one end of the band to have an outer portion thereof spaced from a flat extension of the band; a resilient member having one end adapted to be secured to the other end of the band; a lever having one end pivotally secured to the outer portion of the bracket and a portion to which the other end of the resilient member is secured, said portion being movable to a point spaced from said bracket laterally opposite said one end of the resilient member and inwardly of the outer portion of the bracket; and tool engaging means on said band adjacent said one end arranged to serve as a fulcrum for a lever member to bear against said portion and urge said portion to said point, said tool engaging means being spaced from said bracket outer end a distance approximately equal to the spacing between said lever end and said lever portion.

3. A connector assembly for resiliently securing about an object a band having juxtaposed ends, one of which ends is provided with a longitudinally extending slot, comprising: a bracket provided with an inner portion having a substantial longitudinal extent adapted to extend in facial engagement with said one band end transversely of said slot, and an upstanding portion extending at right angles to said inner portion projecting through said slot to have an outer end of said upstanding portion spaced from the band, the upstanding portion being provided with a notch adjacent the inner portion and opening toward the other end of the band, the upstanding portion of the bracket engaging the face of said one band end opposite the face thereof engaged by the inner portion of the bracket and at the end of the slot closest the other end of the band; a resilient member having one end secured to the other end of the band; and a lever having one end pivotally secured to the outer end of the upstanding portion of the bracket and another end to which the other end of the resilient member is secured, said upper end being movable to a point spaced from the bracket laterally opposite said one end of the resilient member and inwardly of the outer end of the upstanding portion.

4. A connector assembly for resiliently securing about an object a band having ends, one of which ends is provided with a longitudinally extending slot, comprising: a bracket having an inner portion adapted to extend in facial engagement with said one band end transversely of said slot, and an upstanding portion extending at right angles to said inner portion and projecting through said slot to have an outer end of said portion spaced from the band, the bracket having a notch adjacent the inner portion opening toward the other end of the band to permit said upstanding portion of the bracket to engage the face of said one band end opposite the face engaged by the inner portion of the bracket and at the end of the slot closest said other end of the band; a resilient member having one end secured to the other end of the band; and a lever having one end pivotally secured to the outer portion of the bracket and having a portion to which the other end of the resilient member is secured, said lever portion being movable to a point spaced from said bracket laterally opposite said one end of the resilient member and inwardly of the outer portion of the bracket.

5. A connector and band assembly, comprising: a band extending around an object and having juxtaposed ends, one of which is provided with a slot elongated in the direction of the length of the band; a bracket having an enlarged base portion interposed between the band and the object and generally parallel with the surfaces of the band and object, said bracket having an upstanding portion extending outwardly from the base portion, projecting through the slot and having an outer end spaced from the band; a resilient member having one end adapted to be secured to the other end of the band; and a lever having one end pivotally secured to the outer end of said upstanding portion of the bracket and another end to which the other end of the spring is secured, said other end being movable to a point spaced from said bracket laterally opposite said one end of the resilient member and inwardly of the outer end of said upstanding portion.

6. The connector assembly of claim 5, wherein the end of the band is provided with a pair of spaced slots and the bracket is U-shaped having two legs forming the upstanding portion of the bracket and a connecting portion forming the enlarged base portion of the bracket.

7. A band structure comprising: a band having one end provided with a loop upstanding therefrom, the axis of the loop extending transversely of the band end; an extension strip having one end provided with an opening through which the loop extends, the strip extending longitudinally away from the band end, the opening in the strip being elongated longitudinally of the strip and having an enlarged end portion through which said loop extends; and a pin formed as the piece of the strip removed in forming said opening and having an enlarged end, said pin extending axially through the loop, overlying the strip and retaining it in facial juxtaposition to the band end, said enlarged end retaining the pin aganinst longitudinal movement.

8. A band assembly comprising: a band adapted to be disposed circumjacent an object, and having ends; a bracket having an inner portion removably secured to one end of the band to have an outer portion thereof spaced from a flat extension of the band; a lever having one end pivotally secured to the outer portion of the bracket, said lever comprising a rod-like member formed in a U-shaped configuration with two portions, generally at right angles to each other and joined intermediate the ends of the U, a resilient member having one end secured to the other end of the band and the other end secured to the base of the U, said resilient member lying between the legs of the U-shaped lever when said base portion of the U is moved to the point spaced from the bracket opposite the end of the resilient member and inwardly of the outer portion of the bracket.

References Cited in the file of this patent

UNITED STATES PATENTS

| | | |
|---|---|---|
| 295,914 | Enegren | Apr. 1, 1884 |
| 382,540 | Marshall | May 8, 1888 |
| 560,694 | Davis et al. | May 26, 1896 |
| 625,573 | Leavitt | May 23, 1899 |
| 914,761 | Smith | Mar. 9, 1909 |
| 1,277,076 | Ireland | Aug. 27, 1918 |
| 1,414,731 | Englund | May 2, 1922 |
| 1,690,643 | Lavender | Nov. 6, 1928 |
| 1,714,053 | Stokes | May 21, 1929 |
| 1,738,905 | Kiefer | Dec. 10, 1929 |
| 1,819,768 | Coffing | Aug. 18, 1931 |
| 2,106,118 | Jackson et al. | Jan. 18, 1938 |
| 2,390,232 | Venditty | Dec. 4, 1945 |
| 2,482,374 | Ruschmeyer | Sept. 20, 1949 |
| 2,617,011 | MacKendrick | Nov. 4, 1952 |
| 2,666,839 | Boetel | Jan. 19, 1954 |
| 2,835,015 | Emmins | May 20, 1958 |